United States Patent [19]

Knöchel et al.

[11] Patent Number: 4,705,635

[45] Date of Patent: Nov. 10, 1987

[54] PROCESS FOR ENRICHING AND SEPARATING OXIDES OF HEAVY HYDROGEN ISOTOPES FROM ACID, AQUEOUS SOLUTIONS OR OTHER AQUEOUS STREAMS

[75] Inventors: Arndt Knöchel; Burghard Döscher, both of Hamburg; Wolfgang Podestà, Leverkusen, all of Fed. Rep. of Germany

[73] Assignee: Kernforschungszentrum Karlsruhe GmbH, Fed. Rep. of Germany

[21] Appl. No.: 837,918

[22] Filed: Mar. 10, 1986

[30] Foreign Application Priority Data

Mar. 9, 1985 [DE] Fed. Rep. of Germany ....... 3508503

[51] Int. Cl.$^4$ .............................................. B01D 11/04
[52] U.S. Cl. .................................... 210/633; 210/638; 210/682; 423/249; 423/380; 423/648 A
[58] Field of Search ............... 210/633, 638, 660, 681, 210/682; 423/249, 380, 648 A

[56] References Cited

U.S. PATENT DOCUMENTS

| | | | |
|---|---|---|---|
| 3,214,486 | 10/1965 | Doyle et al. | 423/648 A X |
| 3,464,789 | 9/1969 | Courvoisier et al. | 423/648 A X |
| 3,995,017 | 11/1976 | Holtslander et al. | 423/648 A |
| 4,085,061 | 4/1978 | O'Brien | 210/682 X |
| 4,452,702 | 6/1984 | Blasius et al. | 210/638 |
| 4,519,996 | 5/1985 | Knöchel et al. | 423/580 X |

*Primary Examiner*—Robert Spitzer
*Attorney, Agent, or Firm*—Sughrue, Mion, Zinn, Macpeak & Seas

[57] ABSTRACT

A process for the enrichment and separation of oxides of heavy hydrogen isotopes from acid, aqueous solutions or other aqueous streams employs macrocyclic aminopolyether (APE) and organic cation exchange agents. The aqueous solution or the aqueous stream is mixed with at least one organic solvent which is miscible with water to form a liquid mixture. An organic acid cation exchange agent in the H-form is charged with a protonized APE to form a solid phase. The liquid mixture is brought into contact with the solid phase to bring about the enrichment of the heavy hydrogen isotope on the solid phase at a low temperature. The heavy hydrogen isotope from the solid phase is then released at a temperature that is higher by between 30° K. and 150° K. than the temperature at which the enrichment occurred.

13 Claims, No Drawings

PROCESS FOR ENRICHING AND SEPARATING OXIDES OF HEAVY HYDROGEN ISOTOPES FROM ACID, AQUEOUS SOLUTIONS OR OTHER AQUEOUS STREAMS

BACKGROUND OF THE INVENTION

The present invention relates to a process for the enrichment and separation of oxides of heavy hydrogen isotopes from acid, aqueous solutions or other aqueous streams in which macrocyclic aminopolyether (APE) and an organic cation exchange agent are used, and in which there is a multi-stage repetition of single stages of enrichment of the heavy hydrogen isotopes on the APE and of single stages of release of the isotopes from the APE in the form of their oxides.

A process according to the above type is known from the German patent publication DE No. 32 02 776 A1 and corresponding U.S. Pat. No. 4,519,996. There, heavy hydrogen isotopes, namely, deuterium and/or tritium, are removed with the use of isotope exchange equilibria from aqueous streams containing them, especially from those streams encountered in the reprocessing of irradiated nuclear fuels and/or breeding materials. In one embodiment of the process disclosed in German DE OS No. 32 02 776 A1 and corresponding U.S. Pat. No. 4,519,996, in a first stage of the process, the acid, aqueous solution or another aqueous stream containing deuterium and/or tritium is first put in contact with a macrocyclic aminopolyether (APE) and, after completely dissolving the APE in aqueous solution or aqueous stream to form a liquid phase, the liquid phase is brought into contact with an organic cation exchange agent in its H+ form. After a certain amount of time which is needed for the adjustment of the exchange equilibrium, on the cation exchanger, the ion exchange phase, now containing the APE and heavy hydrogen, is separated by filtration from the liquid phase which is now depleted in heavy hydrogen. The solid ion exchange phase then is added to a column and rinsed with an aqueous base, containing heavy hydrogen ions, for example, with an aqueous 30% tetraethylammoniumhydroxide solution, to release the heavy hydrogen from the APE and thereby obtain an eluate which is enriched with heavy hydrogen. This eluate can be subjected to a further exchange in a separate stage to obtain a solution which is further enriched with heavy hydrogen in the elution product.

After the release of the heavy hydrogen from the APE in the first stage, the APE is still on the cation exchange agent. By treating the cation ion exchange agent with an acid, the APE is removed from the cation exchange agent matrix, and then is fed to an anion exchange column. The elution product of this anion exchange column contains the free aminopolyether in aqueous solution, and the free aminopolyether can be recovered by evaporation of the aqueous solution and recycled for reuse. For the removal of the APE from the cation exchange agent, it is also possible to use a lithium chloride solution instead of an acid. The APE is then extracted from the lithium chloride solution with the aid of an organic solvent. The APE recovery then is done by evaporation of the organic solvent, and the APE can then be reused.

The embodiment of the process disclosed in DE-OS No. 32 02 776 A1 and U.S. Pat. No. 4,519,996 which works with APE and cation exchange agents has some aggravating disadvantages which are unacceptable for continuous use, especially the use of additional chemicals needed for the regeneration of the APE and ion exchange columns, and the connected appearance of secondary waste when using the procedure in a nuclear installation (for example, the formation of additional amount of potassium nitrate).

SUMMARY OF THE INVENTION

A primary object of the present invention is to provide a process which avoids the disadvantages inherent in the process according to the state of the art, and especially to provide a new process which eliminates the requirement for the use of additional chemicals and the connected appearance of secondary waste, and which eliminates the need to separate the aminopolyethers from the ion exchange agent.

Another object of the present invention is to provide such a process which permits relatively high enrichment factors per separation level and provides for a simpler execution of the process.

Additional objects and advantages of the present invention will be set forth in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for enriching and separating oxides of heavy hydrogen isotopes from an acid, aqueous solution or another aqueous stream in which macrocyclic aminopolyether (APE) and an organic cation exchange agent are used, and in which there is a multi-stage repetition of single stages of the enriching of the heavy hydrogen isotopes on the APE and a release of the heavy hydrogen isotopes in the form of their oxides comprising (a) mixing the solution or the aqueous stream with at least one organic solvent which is miscible with water to form a liquid mixture, (b) charging an organic, acid cation exchange agent in the H+ form with a protonized or diprotonized APE to form a solid phase, (c) bringing the liquid mixture from step (a) into contact with the solid phase from step (b) to effect an isotope exchange in which the heavy hydrogen isotopes are enriched on the solid phase and depleted from the resulting liquid phase, (d) adjusting the temperature of the solid phase to a low temperature so that the isotope exchange of step (c) in which there is an enrichment of the heavy hydrogen isotope on the solid phase, takes place at the low temperature, which is above the freezing or disintegration temperature of the liquid phase, and (e) raising the temperature of the solid phase to a temperature which is higher than in step (d) by a difference in the range of between 30° K. and 150° K., and bringing a liquid mixture containing the solvent and the solution or the another aqueous stream, containing the heavy hydrogen oxides in a similar concentration as in the liquid mixture in step (c), into contact with the solid phase at the higher temperature to bring about enrichment of the heavy hydrogen isotope in the resulting liquid phase.

The depleted liquid phase formed in step (c) can be separated from the organic solvent by rectification or distillation to form an aqueous solution depleted in heavy hydrogen. This aqueous phase can be handled as waste or can be led on to further treatment in the next depletion stage which is executed as described. Alternatively, the depleted liquid phase formed in step (c) can be led without separation to next depletion stage which is executed as described.

The enriched liquid phase formed in step (e) can be separated from the organic solvent by rectification or distillation to form an aqueous product solution which can be handled as product or can be led on to further treatment in the next enrichment stage, which is executed as described. Alternatively, the enriched liquid phase can be led without separation to next enrichment step which is executed as described.

Preferably, the acid cation exchange agent is a styrene divinylbenzene copolymerizate which contains sulfonic acid or carbonic acid groups.

It is also preferred that the APE be a monocyclical or bicyclical compound which contains nitrogen as a ring binding atom.

The organic solvent used to form the liquid mixture preferably is a low viscosity liquid of at least one compound from the group tetrahydrofuran, acetone, methanol, ethanol, N,N'dimethylformamide, trimethylphosphate, triethylphosphate, ethanthiol or isopropanthiol.

The isotope exchange for the enrichment of the heavy hydrogen isotope on the solid phase preferably is performed at a temperature in the range of between 203° K. and 263° K.

The isotope exchange for the release of the heavy hydrogen isotope from the solid phase into the liquid phase preferably is performed at a temperature in the range of between 293° K. and 353° K.

In an alternative procedure according to the present invention the loading of the cation exchange agent with the APE is carried out simultaneously with its contacting of the liquid mixture from step (a).

The process according to the present invention permits a particularly simple operation of a multi-stage separation process for deuterium or tritium enrichment and/or depletion.

The process control is done by varying the column temperature and by alternating switching of the elution product stream to the next depletion and enrichment stage respectively.

The enrichment factors for tritium are dependent on the content of the added organic solvent or/and its chemical configuration. Typical enrichment factors ($\beta$) are form 1.01 to 1.07 for each separation stage, where the difference in temperature ($\Delta T$) between the enrichment on the solid phase and the release of heavy hydrogen isotopes from the solid phase is equal to 50° K. An increase of the separation output is possible by a further temperature decrease for the solid phase enrichment or temperature increase for the release of heavy hydrogen isotopes from the solid phase.

Of particular advantage in the process according to the present invention is the enriching of deuterium and tritium containing solutions, especially those with a low content of deuterium or tritium, directly and without the previous conversion HDO→HD, HTO→HT exclusively in liquid phases and without the addition of waste producing chemicals. The process can be executed continuously or discontinuously. The liquid mixture can be brought continuously or discontinuously into contact with the solid phase in step (c).

It is to be understood that both the foregoing general description and the following detailed description are exemplary and explanatory, but are not restrictive of the invention.

DETAILED DESCRIPTION OF THE INVENTION

Particularly suitable APE which can be used for the process according to the invention are:
APE:
1,7,10,13,19-pentaoxa-4,16-diazacyclomoneicosan (3.2)
1,7,10-trioxa-4,13-diazacyclopentadecan (2.1)
4,7,13,16,21-pentaoxa-1,10-diazabicyclo[8.8.5]tricosan (2.2.1)
4,7,13,16,21,24-hexaoxa-1,10-diazabicyclo[8.8.8]hexacosan (2.2.2)

The designations "3.2", "2.1", "2.2.1", "2.2.2" and the like are well known as shown in "Topics in Current Chemistry", Volume 98, page 10, E. Weber, F. Voegtle, Springer-Verlag Berlin (1981).

Aminopolyethers as described in U.S. Pat. No. 4,519,996 can be used, which is hereby incorporated by reference.

Suitable cation exchangers for use in the present invention are cross-linked synthetic resins having acid groupings, specifically the exchangers made by various manufacturers and incorporating sulfonic acid or carboxyl groups. Examples of suitable cation exchangers are listed below.

Cation Exchange Agents (Commercial Names)

Dowex: 50 WX 8
Dowex: 50 WX 10
Amberlyst: 15

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Tritium Enrichment in a Solid-Liquid System Comprised of Ion Exchange Agent and APE as the Solid Phase/and a Binary Solvent System of Organic Solvent and Water as the Liquid Phase Added to a glass column which has a cooling jacket, are 7 g of an ion exchange agent sold under the commercial name DOWEX 50 WX 8 in the H+ form. The column is then charged with 9.1 mMol of the bicyclical APE 2.2.1.

The thus charged column is then rinsed with a liquid phase in the form of a solvent mixture of 80% by volume trimethylphosphate and 20% by volume of water having a nitric acid content sufficient to provide a pH of 2 to the 20% by volume water (free of HTO). The rinsing is continued until refractometric measurements indicate, that the solvent mixture no longer changes its composition when flowing through the column. The total volume of the liquid phase employed for the rinsing is about 17 ml.

With the aid of a thermostat, the column temperature is lowered to 243° K. Subsequently, 36 ml of the above described solvent mixture, which contains 0.2 MBq/ml tritium as HTO, is slowly pumped through the column.

In the beginning, the elution product is free of tritium, until, after a dead volume (corresponding to 17 ml), a solution that is poor in tritium and has a specific activity of 0.18 MBq/ml appears at the end of the column. Thus, there occurred an isotope exchange in which the heavy hydrogen isotope was enriched on the solid phase.

After a total of 34 ml of the solvent mixture have flown through, the column temperature is raised to 303° K., and 17 ml of the above described solvent mixture with a specific tritium activity of 0.2 MBq/ml is pumped through the column. The elution product is enriched with tritium and has a specific activity of 0.22 MBq/ml.

The process can be repeated without separation of the organic solvent, feeding the column with the enriched or depleted solvent mixture and pumping 17 ml of the tritium containing solvent mixture (corresponding to the dead volume) through it. The column was filled with APE loaded ion exchange agent in the described manner. The total enrichment (depletion) factor is given by $\alpha^s$, where "$\alpha$" is the enrichment (depletion) factor of a single stage and "$s$" is the number of the stages. For 5 stages the enrichment was found in 42.5 ml to be 0.32 MBq/ml, the depletion was found in 42.5 ml to be 0.12 MBq/ml, after pumping 5×17 ml through a cascade of 5 columns on the enrichment and on the depletion line.

EXAMPLE 2

Deuterium Enrichment in a Solid-Liquid Phase (Ion Exchange Agent-APE/Binary Solvent Mixture)

Added to 10 g of an ion exchange agent sold under the commercial name DOWEX 50 WX 10 in the H+ form are 25 ml of a solution consisting of 90% by volume methanol and 10% by volume water having a nitric acid content sufficient to provide the water with a pH of 1, the solution having a deuterium content of 2 mMol/ml, and 13.3 mMol of the monocyclic aminopolyether 3.2. Subsequently, the resulting solid-liquid mixture is vibrated for 20 minutes while cooling to 233° K.

The solid-liquid mixture is filtered through a frit, whereby about 15 ml of a filtrate with a deuterium content of 1.9 mMol/ml are collected.

The still moist resin which has now bound all the APE and contains the enriched deuterium, is removed from the frit and vibrated at a temperature of 298° K. with 15 ml of the above described solution (without APE additive). Filtration is giving about 15 ml of a deuterium enriched solution with a deuterium content of 2.1 mMol/ml.

The process can be repeated about ten times as described above, then the ion exchange agent losses have to be compensated by the addition of new resin.

EXAMPLE 3

Tritium Enrichment in a Solid-Liquid System (Ion Exchange Agent-APE/Ternary Solvent Mixture)

7 g of an ion exchange agent sold under the commercial name Amberlyst 15 in the H+ form are added to a glass column having a cooling jacket. The column is then charged with 9 mMol of the bicyclical APE 2.2.2.

The thus charged column is rinsed with a solution mixture consisting of 80% of volume acetone, 10% by volume ethanthiol and 10% by volume of aqueous nitric acid of pH 2 containing HTO until the solution composition no longer changes when passing through the column. The liquid phase can be led through the column in a closed circuit. The total volume of liquid employed in the rinsing is about 20 ml, and the specific tritium activity in the solution mixture is 0.2 MBq/ml.

With the aid of a thermostat, the column temperature is adjusted to 233° K. Then, 17 ml of the above described solvent mixture, again containing 0.2 MBq/ml tritium as HTO, are slowly pumped through the cooled column.

In the elution product, the specific tritium activity is 0.17 MBq/ml, thus it is tritium depleted.

Subsequently, the column temperature is raised to 293° K., and a solvent volume of about 17 ml (corresponding to the dead volume of the column) having the same composition and specific tritium activity as described above is passed through.

The elution product emerging at the end of the column shows an activity of 0.23 MBq/ml.

After separation of the water content by rectification the process can be repeated as described above.

It will be understood that the above description of the present invention is susceptible to various modifications, changes and adaptations, and the same are intended to be comprehended within the meaning and range of equivalents of the appended claims.

What is claimed is:

1. Process for enriching and separating oxides of heavy hydrogen isotopes from an acid, aqueous solution or another aqueous stream in which macrocyclic aminopolyether (APE) and an organic cation exchange agent are used, and in which there is a multistage repetition of single stages of (i) the enriching of the heavy hydrogen isotopes on the APE and (ii) a release of the heavy hydrogen isotopes in the form of their oxides, comprising:

(a) mixing the solution of the aqueous stream with at least one organic solvent which is miscible with water to form a liquid mixture, (b) charging an organic, acid cation exchange agent in the H+ form with a protonized or diprotonized APE to form a first solid phase, (c) bringing the liquid mixture from step (a) into contact with the first solid phase from step (b) to effect an isotope exchange in which the heavy hydrogen isotopes are enriched on the first solid phase and depleted from the resulting liquid phase, thereby forming an enriched solid phase and a depleted liquid phase, (d) adjusting the temperature of the first solid phase to a low temperature so that the isotope exchange of step (c) in which there is an enrichment of the heavy hydrogen isotopes on the first solid phase takes place at the low temperature, which is above the freezing or disintegration temperature of the liquid phase, and (e) raising the temperature of the enriched solid phase to a temperature which is higher than in step (d) by a difference of between 30° K. and 150° K., and bringing a liquid mixture containing the solvent and the solution or the another aqueous stream, containing the heavy hydrogen oxides in a similar concentration as in the liquid mixture in step (c), into contact with the enriched solid phase at the higher temperature to bring about enrichment of the heavy hydrogen isotopes in the resulting liquid to thereby form an enriched liquid phase.

2. Process according to claim 1, wherein the depleted liquid phase formed in step (c) is separated from the organic solvent by rectification or distillation to form an aqueous solution depleted in heavy hydrogen.

3. Process according to claim 1, wherein the depleted liquid phase formed in step (c) is led without separation of the organic solvent to a depletion step.

4. Process according to claim 1, wherein the enriched liquid phase formed in step (e) is separated from the organic solvent by rectification or distillation to form an aqueous product solution.

5. Process according to claim 1, wherein the enriched liquid phase formed in step (e) is led without separation of the organic solvent to an enrichment step.

6. Process according to claim 1, wherein the acid cation exchange agent is a styrene-divinylbenzene copolymerizate which contains sulphonic acid or carboxylic acid groups.

7. Process according to claim 1, wherein the APE is a monocyclical or bicyclical compound which contains nitrogen as a ring binding atom.

8. Process according to claim 1, wherein the organic solvent is a low viscosity liquid of at least one compound selected from the group consisting of tetrahydrofuran, acetone, methanol, ethanol, N,N'dimethylforamide, trimethylphosphate, triethylphosphate, ethanthiol or isopropanthiol.

9. Process according to claim 1, wherein the isotope exchange for the enrichment of the heavy hydrogen isotope in step (c) is done on the first solid phase at a temperature in the range of between 203° K. and 263° K.

10. Process according to claim 1, wherein the isotope exchange in step (e) for the release of the heavy hydrogen isotope from the enriched solid phase into the liquid phase is done at a temperature in the range of between 293° K. and 353° K.

11. Process according to claim 1, wherein the charging of the cation exchange agent with the APE is carried out simultaneously with its contacting of the liquid mixture from step (a).

12. Process according to claim 1, wherein the temperature of the first solid phase is adjusted in step (d) before the first solid phase is brought into contact with the liquid mixture.

13. Process according to claim 1, wherein the temperature of the first solid phase is adjusted in step (d) during contact of the first solid phase with the liquid mixture.

* * * * *